United States Patent [19]

Fukai

[11] Patent Number: 5,466,129
[45] Date of Patent: Nov. 14, 1995

[54] VALVED DISCHARGE MECHANISM OF A REFRIGERANT COMPRESSOR

[75] Inventor: Isamu Fukai, Fujioka, Japan

[73] Assignee: Sanden Corporation, Tokyo, Japan

[21] Appl. No.: 142,076

[22] Filed: Oct. 28, 1993

[30] Foreign Application Priority Data

Oct. 28, 1992 [JP] Japan .................. 4-080268 U

[51] Int. Cl.⁶ .................................... F04B 1/16
[52] U.S. Cl. .................. 417/269; 417/571; 137/512.4; 137/856
[58] Field of Search ..................... 417/269, 566, 417/569, 571; 137/856, 512.4

[56] References Cited

U.S. PATENT DOCUMENTS

| Re. 27,844 | 12/1973 | Olson, Jr. | |
|---|---|---|---|
| 2,592,343 | 4/1952 | Scheldorf | 417/571 |
| 2,825,499 | 3/1958 | Gibson et al. | |
| 3,008,629 | 11/1961 | Gerteis | |
| 4,226,572 | 10/1980 | Nakayama et al. | 417/269 |
| 4,693,674 | 9/1987 | Fukai et al. | |
| 5,100,306 | 3/1992 | Moran, Jr. et al. | 417/269 |
| 5,213,488 | 5/1993 | Takahashi | 417/566 |

Primary Examiner—Richard A. Bertsch
Assistant Examiner—Charles G. Freay
Attorney, Agent, or Firm—Baker & Botts

[57] ABSTRACT

A refrigerant compressor includes a compressor housing divided at least partially by a valve plate into a first chamber comprising a compression chamber, and a second chamber comprising a discharge chamber. A fluid conduit links the compression chamber with the discharge chamber. An elastic valve member opens and closes the end of the conduit. The valve member has a predetermined spring constant such that the end opening of the conduit remains blocked until the pressure in the compression chamber reaches a predetermined value. An integral gasket is positioned between the valve plate and the front and rear housings and comprises an outermost, an intermediate and an innermost annular portion chamber. Outer ribs are connected between the outermost and the intermediate annular portion, and inner ribs are connected between the intermediate and the innermost annular portions. The inner ribs are aligned with the discharge valve and have a portion bent outwardly with respect to the valve plate for limiting the magnitude of the opening of the valve member. The front and rear housings include radial projections extending from an inner surface thereof. The projections include an end surface which supports the bent portion of the respective ribs.

13 Claims, 6 Drawing Sheets

VALVED DISCHARGE MECHANISM OF A REFRIGERANT COMPRESSOR

BACKGROUND OF THE INVENTION

1. Field of the Invention

The present invention relates to a refrigerant compressor and, more particularly, to a valved discharge mechanism of a refrigerant compressor used in an automotive air conditioning system.

2. Description of the Prior Art

The valved discharged mechanism of a refrigerant compressor is well known in the prior art. For example, U.S. Pat. No. 4,226,572 discloses a structure and operational mechanism of a valved discharge mechanism in a refrigerant compressor. As disclosed therein, and referring to FIGS. 1 and 2 herein, a refrigerant compressor includes a cylinder block 1 comprised of a front cylinder block 1a and a rear cylinder block 1b. Further, the refrigerated compressor of FIGS. 1 and 2 includes front and rear housings 4a and 4b. Also provided are valve plates 3 located adjacent to each of the front cylinder block 1a and the rear cylinder block 1b. Valve plates 3 have a discharge hole 3a therethrough for selectively communicating the compression chamber with the discharge chamber. A discharge valve assembly includes discharge reed valve 21 and gasket 100 which are secured between valve plates 3 and housings 4a and 4b. Discharge reed valve 21, which is made of elastic material, regulates the flow of the refrigerant gas and makes sealing contact with one end of discharge hole 3a.

Figure 1:
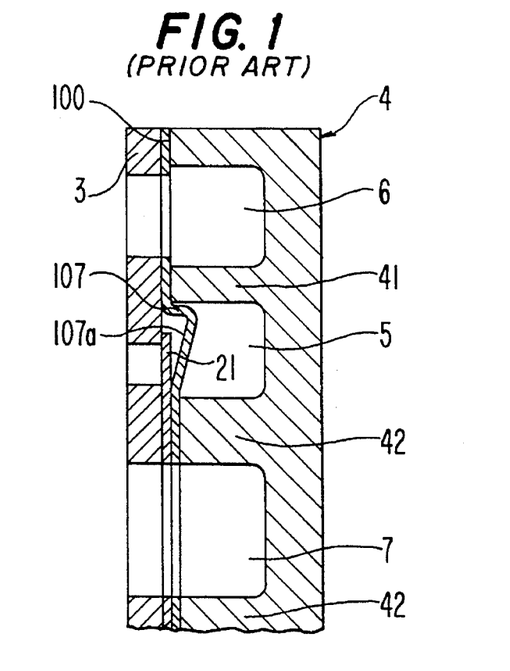
FIG. 1 is a sectional view of a discharge valve assembly in accordance with the prior art.

Gasket 100 includes radial ribs 107 arranged so as to be in alignment with discharge reed valve 21. Radial ribs 107 limit the bending movement of discharge reed valve 21 in the direction away from discharge hole 3a. Discharge reed valve 21 bends to block and open discharge hole 3a, and has a predetermined value of elastic modulus which allows discharge reed valve 21 to block the opening of discharge hole 3a until the pressure in the compression chamber 2 reaches a predetermined value.

In this arrangement, when the refrigerant compressor operates at high rotational speeds and/or under a high load, discharge reed valve 21 opens at a rapid rate until it comes in contact with curved portion 107a of radial rib 107. Curved portion 107a of radial rib 107 gradually deteriorates under the continued stress of this collision load. Eventually, the collisions cause radial rib 107 to be partially or fully broken or cracked. In the prior art, in order to prevent such breaking or cracking, the rigidity and/or thickness of the steel plate forming gasket 100 has been increased in order to reasonably bear these collisions. Even with a limited increase in rigidity and/or thickness of gasket 100, the life of gasket 100 is shortened. The durability of the compressor is thus decreased. Also, gasket 100 cannot be formed from nonferrous metals, such as aluminum or a thin steel plate which are produced at a low price, because gasket 100 is required to have a high rigidity.

SUMMARY OF THE INVENTION

It is an object of the present invention to provide a refrigerant compressor for use in an automotive air conditioning system having a valved discharge mechanism and retainer which can effectively prevent breaking and cracking of components without increasing the rigidity of the materials used in forming the gasket.

It is a further object of the present invention to provide a refrigerant compressor having a valved discharge mechanism wherein the gasket can be formed from nonferrous metals, such as aluminum or a thin steel plate which are produced at a low price.

According to the present invention, a refrigerant compressor includes a compressor housing divided at least partially by a valve plate into a first chamber comprising a compression chamber, and a second chamber comprising a discharge chamber. A linking means links the compression chamber to the discharge chamber. The linking means includes a conduit communicating the compression chamber with the discharge chamber and having an end opening. An elastic valve member opens and closes the end opening of the conduit. The valve member has a predetermined spring constant such that the end opening of the conduit remains blocked until the pressure in the compression chamber reaches a predetermined value. An integral gasket is adapted to be arranged between the valve plate and the front and rear housings 4a and 4b and comprises an outermost, an intermediate and an innermost annular portion for applying hermetic seals to boundary portions of the compression chamber and the discharge chamber. A rib means is connected between the outermost and the intermediate annular portion, and between the intermediate and the innermost annular portions. The rib means includes radially extending ribs which are arranged in alignment with discharge valve means and have, respectively, a portion bent outwardly with respect to the valve plate for limiting the magnitude of the opening motion of the valve member. The front and rear housings 4a and 4b include a limiting means having a projection radially projected from an inner surface of the radial end of the discharge chamber. The projection includes an end surface formed at axial end thereof so as to closely support the rib of the gasket.

Further objects, features and aspects of the present invention will be understood from the detailed description of the preferred embodiment of the present invention with reference to the attached drawings.

DETAILED DESCRIPTION OF THE DRAWINGS

Figure 2:
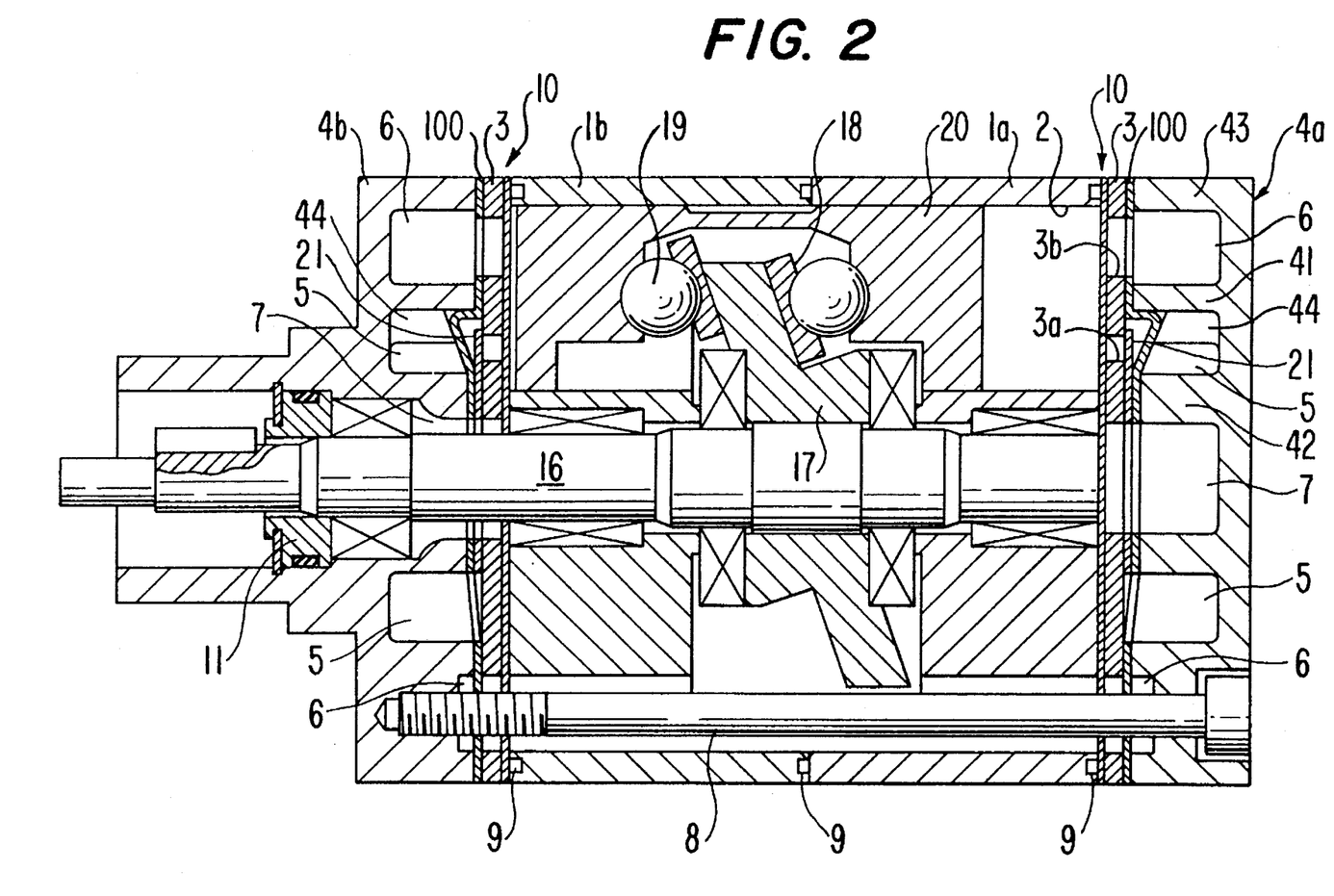
FIG. 2 is a longitudinal sectional view of a multi-cylinder swash plate type compressor in accordance with the present invention.

FIG. 2 illustrates an integral arrangement of a swash plate type compressor having five cylinder bores in each of a front and a rear cylinder block and employing the valve assembly of the present invention. The compressor has a pair of cylindrical cylinder blocks, i.e., a front cylinder block 1a and a rear cylinder block 1b, combined with each other in an axial alignment, and thereby forming a combined cylinder block. Each of front and rear cylinder blocks 1a and 1b is formed with five axially extending cylinder bores 2 which are arranged around a central axis of the combined cylinder block at an equal circumferential distance between the neighboring two cylinder bores 2. The five cylinder bores 2 of the front cylinder block 1a are axially in alignment with those of the rear cylinder block 1b. The front end of the combined cylinder block is closed by front housing 4a, via a valve assembly 10, and the rear end of the combined cylinder block is closed by rear housing 4b, via valve assembly 10. Front and rear housings 4a and 4b are formed with substantially annularly extending discharge chambers 5 surrounding central oil reserving chambers 7. Front and rear housings 4a and 4b are also formed with outermost suction chambers 6 extending so as to substantially surround discharge chambers 5. Suction chambers 6 are interconnected with oil reserving chamber 7 through passageways which are not illustrated in FIG. 2. Discharge chambers 5 are provided with refrigerant discharge outlets (not shown) for discharging compressed high pressure refrigerant toward an outside air-conditioning system. Front and rear valve assemblies 10 have equivalent structures, and each of two valve assemblies 10 includes a valve plate 3 which is attached to the end of the front and rear end, respectively, of the combined cylinder block. The valve plates 3 are formed with a central bore which is connectable with oil reserving chamber 7. The central bore is also connectable with chambers 6 and cylinder bores 2 at the suction stage of the cylinder bores 2 and at discharge hole 3a for communication of cylinder bores 2 and discharge chamber 5 at the discharge stage of respective cylinder bores 2. The inner side of each suction hole 3b of valve plate 3 is closed by an openable suction reed valve (not shown).

In addition, the outer side of each discharge hole 3a of valve plate 3 is selectively closed and opened by discharge reed valve 21. Between the outer face of valve plate 3 and front or rear housing 4a or 4b, gasket 100 is provided. Gasket 100 functions as a retaining means for discharge reed valve 21. Front and rear housings 4a and 4b are each combined with a valve assembly 10 and the combined cylinder block, all of which are tightly fastened by means of bolt 8 which is inserted from the side of front housing 4a, toward the side of rear housing 4b through the combined cylinder block. Coaxially passing through both cylinder blocks 1a and 1b, rear housing 4b, and rear valve assembly 10, drive shaft 16 is rotatably supported by suitable bearing means, and is provided with swash plate 17 secured thereto. Swash plate 17 is operatively connected with, via ball bearings 19 and shoes 18, double acting multi pistons 20 which are slidably fitted in cylinder bores 2 of the combined cylinder block. Reference numeral 9 indicates a ring seal which forms an air-tight seal between mated parts, and reference numeral 11 is a conventional oil seal.

Figure 3:
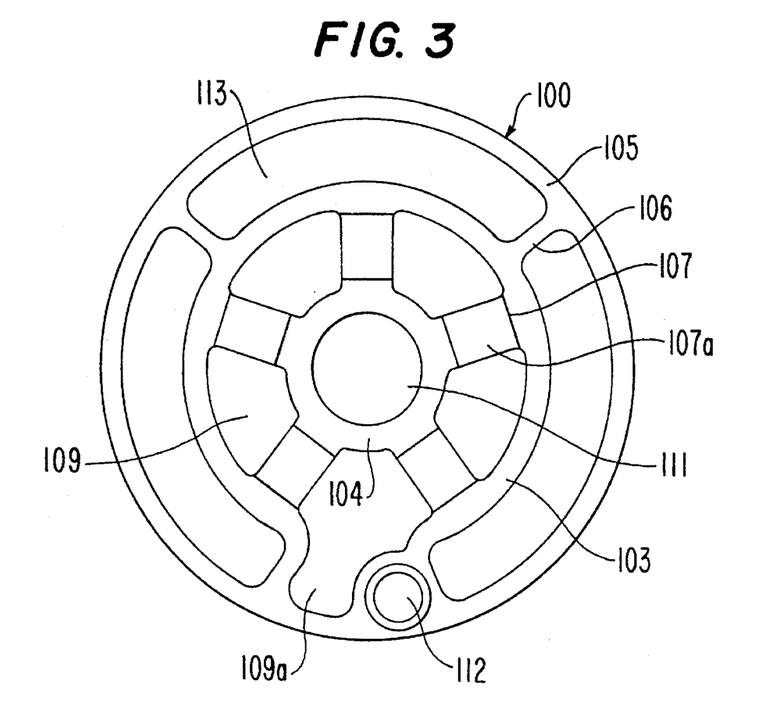
FIG. 3 is a plan view of the gasket shown in FIG. 2.

The structure of gasket 100 of valve assembly 10 will be hereinbelow described with reference to FIGS. 2, 3, and 4.

Gasket 100 is preferably made of a thin steel plate having a generally circular shape, of which the diameter is substantially equal to valve plate 3 and front and rear housings 4a and 4b. In producing gasket 100, the thin steel plate is coated, on both sides, with a resilient film, such as a rubber film. Gasket 100 is formed with central circular aperture 111 in axial alignment with the oil reserving chambers 7 of front and rear housings 4a and 4b. Surrounding the central aperture 111 of gasket 100, are substantially fan-shaped apertures 109 and 109a, which are arranged in a coaxial relationship with the discharge chambers 5 of front and rear housings 4a and 4b. Gasket 100 is further provided with an intermediate annular portion 103 contacting separation wall 41 of front and rear housings 4a and 4b. Separation wall 41 separates suction chamber 6 from discharge chamber 5. The gasket 100 is also provided with innermost annular portion 104 contacting separation walls 42 of front and rear housings 4a and 4b, which walls separate discharge chambers 5 from oil reserving chambers 7. An outermost annular portion 105 of gasket 100 is provided so as to be mated with outermost walls 43 of front and rear housings 4a and 4b. These three annular portions 103, 104 and 105 form hermetic seals to the respective boundary portions of discharge chambers 5, suction chambers 6, and oil reserving chambers 7. Innermost annular portion 104 of gasket 100 also functions to retain outlet reed valve 21 in position.

The above mentioned three annular portions 103, 104 and 105 are interconnected with one another by means of a plurality of radial ribs 106 and 107, so that an integral gasket 100 is constituted. Radial ribs 107 are arranged so as to be in alignment with the five valve ends of discharge reed valve 21. Each of radial ribs 107 extending between the innermost annular portion 104 and intermediate annular portion 103 of gasket 100 is outwardly bent so as to radially slope up from the side of annular portion 104 toward the side of annular portion 103 when viewed from the outer face side of gasket 100. The outwardly bent ribs 107 have curved portions 107a, so as to permit a predetermined magnitude of opening motion of each valve end of discharge reed valve 21. Curved portion 107a includes a curved portion surface 107b facing the inner surface of discharge chamber 5. The curved portion surface 107b of curved portion 107a of radial rib 107 is designed to have a predetermined curvature which is depressed toward discharge reed valve 21 in pre-assembly. Hole 112 in gasket 100 is provided for passing bolt 8 therethrough. Holes 113 are provided for achieving a correct positioning of gasket means 100 with respect to valve plate 3 and front housing 4a.

Figure 4:
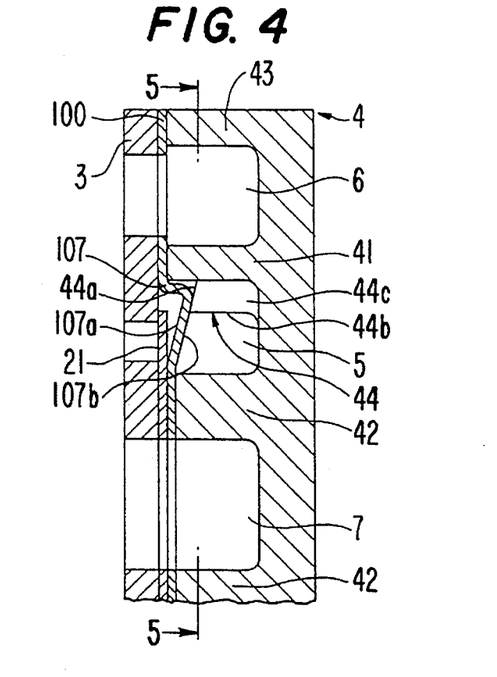
FIG. 4 is a sectional view of a discharge valve assembly in accordance with the first embodiment of the present invention.
Figure 5:
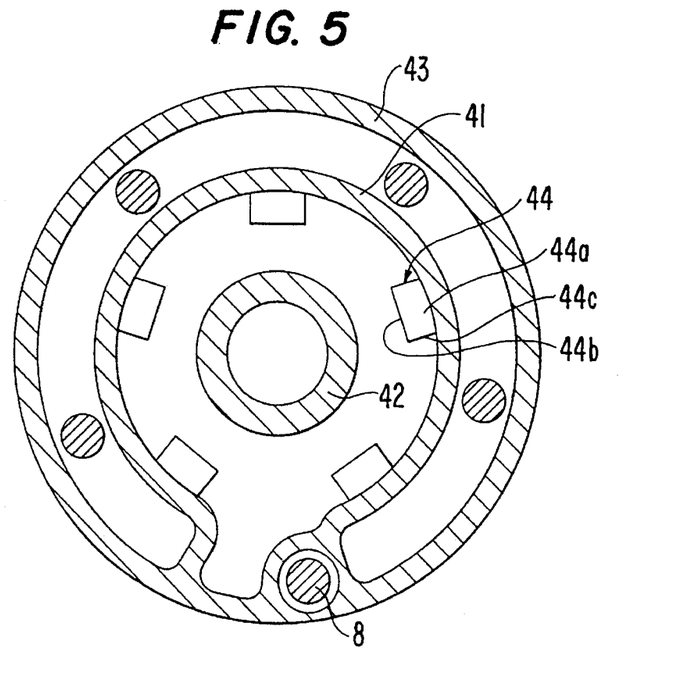
FIG. 5 is a sectional view taken along the line 5—5 of FIG. 4.

FIGS. 4 and 5 illustrate a first embodiment of the present invention. Discharge valve mechanism includes projection portion 44 extending from radial end surface 44b thereof and formed as a rectangular parallelpiped or cylinder shape. Projection portion 44 includes axial end surface 44a formed as a curved surface or a slanted surface and side surface 44c formed at both sides thereof. The width between both side surfaces 44c of projection 44 is designed to be larger than the width of curved portion 107a of radial rib 107. Axial end surface 44a of projection portion 44 is designed to support and perfectly fit curved surface 107b of radial rib 107. Further, axial end surface 44a of projection portion 44 may be designed to depress curved portion surface 107b of radial rib 107 toward discharge reed valve 21 so that an additional curvature of curved portion surface is supplied.

Figure 6:
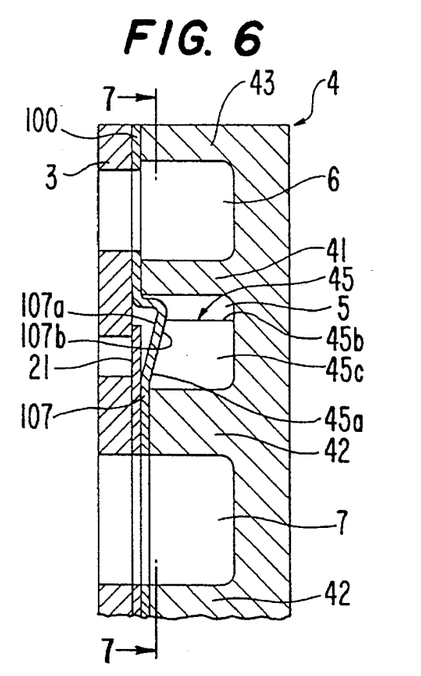
FIG. 6 is a sectional view of a discharge valve assembly in accordance with the second embodiment of the present invention.
Figure 7:
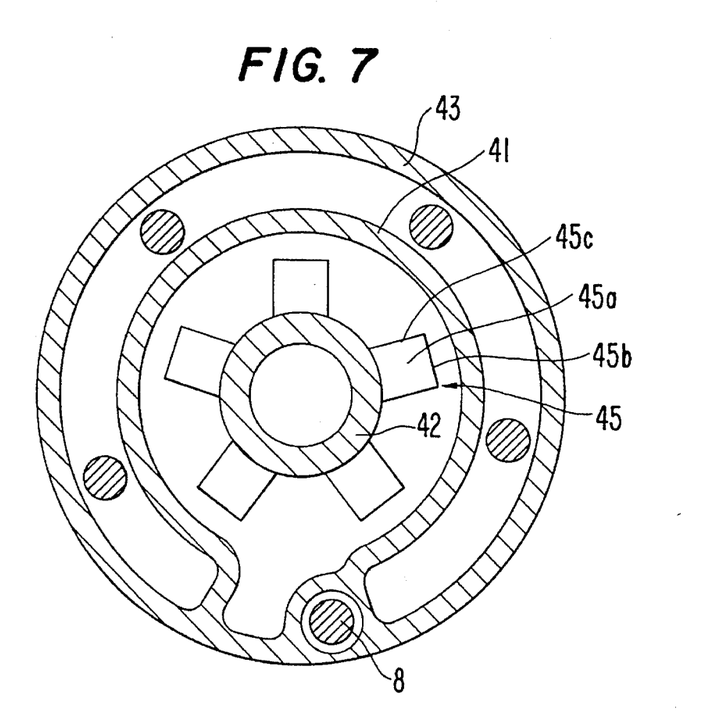
FIG. 7 is a sectional view taken along the line 7—7 of FIG. 6.

FIGS. 6 and 7 illustrate a second embodiment of the present invention. Discharge valve mechanism includes projection portion 45 extending from radial upper end 42a thereof and formed as a rectangular parallelpiped or cylinder shape. Projection portion 45 includes axial end surface 45a which is formed as a curved surface or a slanted surface and side surface 45c formed at both sides thereof. The width between both side surfaces 45c of projection 45 is designed to be larger than the width of curved portion 107a of radial rib 107. Axial end surface 45a of projection portion 45 is designed to support curved portion surface 107b of radial rib 107 without an air gap so that radial end surface 45b of projection portion 45 is radially situated above the position to which the upper end of discharge reed valve 21 opens and comes into contact with curved portion surface 107b of radial rib 107. Further, axial end surface 45a of projection portion 45 may be designed to depress curved portion surface 107b toward discharge reed valve 21 so that an additional curvature of curved portion surface 107b of radial rib 107 is supplied.

Figure 8:
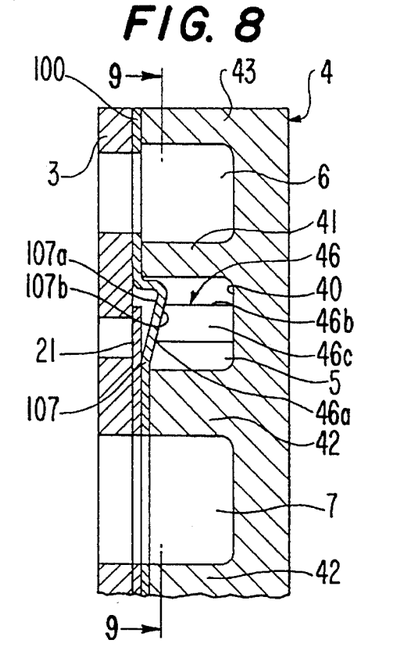
FIG. 8 is a sectional view of a discharge valve assembly in accordance with the third embodiment of the present invention.
Figure 9:
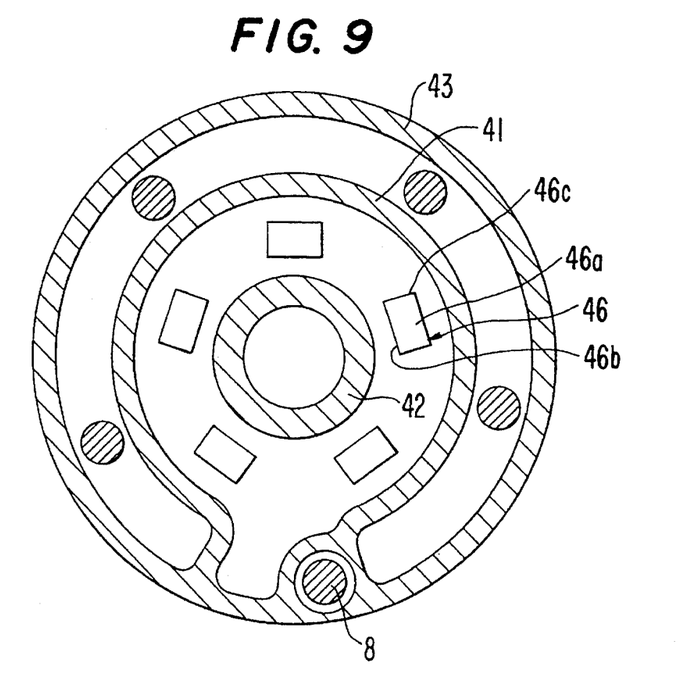
FIG. 9 is a sectional view taken along the line 9—9 of FIG. 8.

FIGS. 8 and 9 illustrate a third embodiment of the present invention. Discharge valve mechanism includes projection portion 46 axially extending from axial inner surface 40 of housing 4 in discharge chamber 5 and formed as a rectangular parallelpiped or cylinder shape. Projection portion 46 includes axial end surface 46a formed as a curved surface or a slanted surface and side surface 46c formed at both sides thereof. The width between both side surfaces 46c of projection 46 is designed to be larger than the width of curved portion 107a of radial rib 107. Axial end surface 46a of projection portion 46 is designed to support and fit with curved portion surface 107b of radial rib 107 without an air gap so that radial end surface 46b of projection portion 46 is radially situated above the position at which the upper end of discharge reed valve 21 opens and comes into contact with curved portion surface 107b of rib portion 107. Further, axial end surface 46a of projection portion 46 may be designed to depress curved portion surface 107b of radial rib 107 toward discharge reed valve 21 in assembly so that an additional curvature of curved portion surface 107b of radial rib 107 is supplied.

Figure 10:
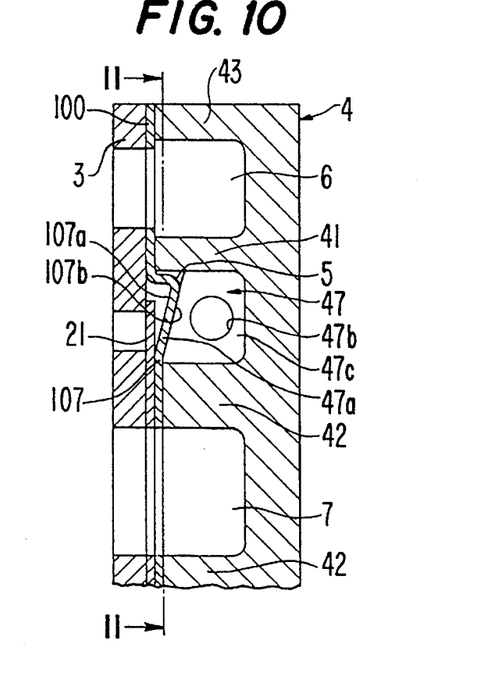
FIG. 10 is a sectional view of a discharge valve assembly in accordance with the fourth embodiment of the present invention.
Figure 11:
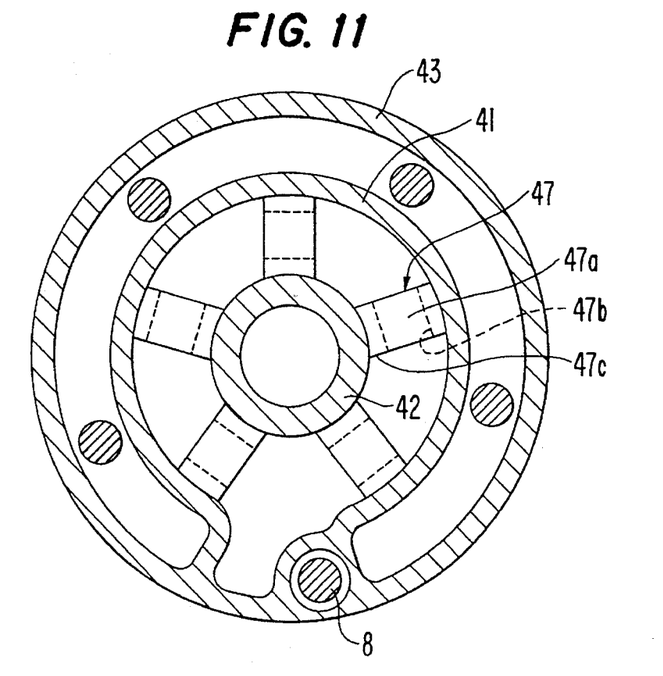
FIG. 11 is a sectional view taken along the line 11—11 of FIG. 10.

FIGS. 10 and 11 illustrate a fourth embodiment of the present invention. Discharge valve mechanism includes projection portion 47 axially extending from axial end 40 of housing 4 in discharge chamber 5 so as to join separation wall 41 to separation wall 42. Projection portion 47 includes axial end surface 47a formed as a curved surface or a slanted surface and side surface 47c formed at both sides thereof. The width between both side surfaces 46c of projection 47 is preferably larger than the width of curved portion 107a of radial rib 107. Axial end surface 47a of projection portion 47 preferably supports curved portion surface 107b of radial rib 107 without an air gap. Alternatively, axial end surface 47a of projection portion 47 may be designed to depress curved portion surface 107b of radial rib 107 toward discharge reed valve 21 so that an additional curvature of curved portion surface 107b of radial rib 107 is supplied. Also, projection portion 47 includes hole 47b formed to radially penetrate therethrough. Hole 47b serves as a passage through which discharge gas can easily flow to the outlet. Further, in this embodiment, a separated block member may be forcibly inserted between separation wall 41 and separation 42 in place of projection portion 47.

When the refrigerant compressor of this invention is operating at high rotational speeds and/or under a high load, discharge reed valve 21 opens and collides with curved portion 107a of radial rib 107. With the compressor embodying this invention, curved portion 107a of radial rib 107 can bear this collision load because the axial end surface 44a of projection portion 44 axially supports curved surface 107a of radial rib 107. This support thus avoids the problems heretofore associated with radial rib 107, such as breaking or cracking. As a result, the life of the discharge valve mechanism can be prolonged and the durability of the compressor can be increased. Also, gasket 100 can be made of nonferrous metals, such as aluminum or a thin steel plate which are produced at low price, because gasket 100 need not have a high rigidity.

Although the present invention has been described in connection with the preferred embodiments, the invention is not limited thereto. For example, this invention is not restricted to a swash plate refrigerant compressor. This invention is also applicable to other types of refrigerant compressors. It will be easily understood by those of ordinary skill in the art that variations and modifications can be easily made and remain within the scope and spirit of this invention as defined by the appended claims.

We claim:

1. A refrigerant compressor comprising:

a first chamber and a second chamber, said first and second chambers being separated at least partially by a valve plate;

a port communicating said first chamber with said second chamber;

a valve member adjacent to said port for selectively opening and closing said port, said valve member having a predetermined spring constant such that said port remains closed until a pressure in said second chamber reaches a predetermined value;

gasket means disposed between said valve plate and said first chamber, said gasket means having at least one rib extending radially outward from the center of said gasket means for limiting the magnitude of an opening motion of said valve member;

at least one housing contacting said gasket means; and a projection extending from said housing into said first chamber, said projection disposed adjacent to said rib of said gasket means.

2. The refrigerant compressor of claim 1 wherein said projection depresses said rib in a direction toward said valve plate.

3. The refrigerant compressor of claim 1 wherein said projection has a curved surface.

4. The refrigerant compressor of claim 1 wherein said projection has a slanted surface.

5. The refrigerant compressor of claim 1 further comprising third and fourth chambers at least partially separated by a second valve plate, a second gasket disposed between said second valve plate and said third chamber, and a second housing contacting said second gasket.

6. A refrigerant compressor comprising:

at least one housing;

a first chamber and a second chamber, said first and second chambers being separated at least partially by a valve plate and said second chamber being formed integrally within said housing;

a third chamber formed integrally within said housing and separated by a wall within said housing from said first chamber;

linking means for linking said first chamber to said second chamber, said linking means including a conduit having an end opening;

an elastic valve member for selectively opening and closing said end opening of said conduit, said valve member having a predetermined spring constant such that said end opening of said conduit remains closed until a pressure in said second chamber reaches a predetermined value;

gasket means disposed between said valve plate and said housing, said gasket means further comprising an outermost, an intermediate and an innermost annular portion for applying hermetic seals to boundary portions of said first chamber and said third chamber, said gasket means further comprising rib means interconnected between said outermost and said intermediate annular portion, and between said intermediate and said innermost annular portions, said rib means including ribs radially extending and arranged in alignment with said elastic valve member, said ribs including a portion bent outwardly with respect to said valve plate, said bent portion limiting the magnitude of opening of said elastic valve member; and a projection extending into said first chamber and comprising an end surface for supporting said rib of said gasket means.

7. The refrigerant compressor of claim 6 wherein said end surface of said projection bends said rib toward said valve member.

8. The refrigerant compressor of claim 6 wherein said end surface of said projection is curved.

9. The refrigerant compressor of claim 6 wherein said end surface of said projection is slanted.

10. A swash plate type compressor comprising:

a pair of cylinder blocks having corresponding cylinder bores arranged in axial alignment;

a plurality of pistons slidably fitted in said cylinder bores;

a drive shaft rotatably supported in said cylinder bores;

a swash plate secured to said drive shaft and operatively connected to said plurality of said pistons;

front and rear housings attached to respective ends of said cylinder blocks, each of said front and rear housings having therein a central oil retaining chamber, an intermediate high pressure refrigerant chamber surrounding said central oil retaining chamber, and an outermost low pressure refrigerant chamber surrounding said high pressure refrigerant chamber, said chambers separated by walls provided in each of said front and rear housings;

at least one valve assembly disposed between at least one of said housings and said cylinder blocks, said valve assembly comprising a valve plate having a plurality of suction ports connecting said low pressure refrigerant chambers with said cylinder bores, and a plurality of discharge ports connecting said high pressure refrigerant chamber with said cylinder bores;

suction reed valve members positioned between at lest one of said cylinder blocks and an inner face of said valve plates, said suction reed valve members opening and closing said plurality of said suction bores of said valve plate;

discharge reed valve members disposed adjacent to an outer surface of said valve plate, said discharge reed valve member having a plurality of reeds opening and closing said plurality of discharge ports;

integral gasket means disposed between said at least one valve plate and said housing, and comprising an outermost, an intermediate and an innermost annular portion for applying hermetic seals to boundary portions of said low pressure refrigerant chambers and said high pressure refrigerant chambers, at least one outer rib connected between said outermost and said intermediate annular portion, and at least one inner rib connected between said intermediate and said innermost annular portions, said at least one inner rib extending radially with respect to a center of said gasket means and arranged in alignment with one of said plurality of reeds, said at least one inner rib including a portion bent outwardly with respect to said valve plate for limiting the magnitude of opening said discharge reed valve member; and said at least one of said housings including a projection radially extending from an inner surface of a radial end of said high pressure refrigerant chamber, said projection including an end surface supporting said bent portion of said rib.

11. The refrigerant compressor of claim 10 wherein said end surface of said projection biases the bent portion of said rib toward said valve member.

12. The refrigerant compressor of claim 10 wherein said end surface of said projection is curved.

13. The refrigerant compressor of claim 10 wherein said end surface of said projections is slanted.

* * * * *